United States Patent
Hoeben et al.

(10) Patent No.: US 12,538,914 B2
(45) Date of Patent: Feb. 3, 2026

(54) SPRAY DEVICE FOR SPRAYING LIQUID ON CROPS

(71) Applicants: Henricus Joannes Godefridus Maria Hoeben, RH Maarheeze (NL); John Leonardus Karel Anna Hoeben, RH Maarheeze (NL); Robertus Matheus Anna Hoeben, RH Maarheeze (NL)

(72) Inventors: Henricus Joannes Godefridus Maria Hoeben, RH Maarheeze (NL); John Leonardus Karel Anna Hoeben, RH Maarheeze (NL); Robertus Matheus Anna Hoeben, RH Maarheeze (NL)

(73) Assignee: WINGSSPRAYER B.V., Nederweert (NL)

(*) Notice: Subject to any disclaimer, the term of this patent is extended or adjusted under 35 U.S.C. 154(b) by 365 days.

(21) Appl. No.: 18/000,029

(22) PCT Filed: May 25, 2021

(86) PCT No.: PCT/NL2021/050326
§ 371 (c)(1),
(2) Date: Nov. 28, 2022

(87) PCT Pub. No.: WO2021/242093
PCT Pub. Date: Dec. 2, 2021

(65) Prior Publication Data
US 2023/0210103 A1  Jul. 6, 2023

(30) Foreign Application Priority Data
May 26, 2020 (NL) .................................. 2025672

(51) Int. Cl.
*A01M 7/00* (2006.01)

(52) U.S. Cl.
CPC .................................. *A01M 7/0064* (2013.01)

(58) Field of Classification Search
CPC .............. A01M 7/0064; A01M 7/0067; A01M 7/0075; A01M 7/0071; A01C 23/047
See application file for complete search history.

(56) References Cited

U.S. PATENT DOCUMENTS 7,063,273 B2 * 6/2006 Hahn .................. A01M 7/0071
239/168

* cited by examiner

*Primary Examiner* — Steven M Cernoch
(74) *Attorney, Agent, or Firm* — Patshegen IP; Moshe Pinchas

(57) ABSTRACT

A spraying device 1 for attachment to an elongated boom 3 present on an agricultural tractor, which extends at right angles to the direction of movement 5 of the agricultural tractor, has an elongated first blade 15, which is parallel to the boom 3. The spraying device also has a number of nozzles 19 which are connected to the first blade 15 and are oriented in a direction opposite to the direction of travel 5. Furthermore, the spraying device has an elongated second blade 25 which is also parallel to the boom 3 and which is spaced from the first blade 15. This second blade 25 is pivotable about a pivot axis 27, which is parallel to the boom 3. The second blade 25 is pivotable independently of the first blade 15 to direct the air flow 27 above the nozzles 19 so that the spray liquid completely ends up on the crop.

10 Claims, 3 Drawing Sheets

SPRAY DEVICE FOR SPRAYING LIQUID ON CROPS

TECHNICAL FIELD OF THE INVENTION

The invention relates to a spraying device for coupling to an elongated boom present on an agricultural tractor for spraying liquid onto crops, comprising:
- an elongated first blade, which can be connected to the boom thereby being pivotable about a first pivot axis parallel to the longitudinal direction of the first blade, the boom during spraying of liquid to the crops, extending in longitudinal direction perpendicular to the direction of movement of the agricultural tractor, the first blade being longitudinally parallel to the boom,
- a number of nozzles, which are connected to the first blade and are directed in a direction transverse to the longitudinal direction of the first blade and opposite to the direction of travel during spraying, and
- an elongated second blade longitudinally parallel to the longitudinal direction of the first blade and spaced from and connected to the first blade, which second blade is pivotable about the first pivot axis and/or a second pivot axis parallel to the first pivot axis, and which second blade is pivotable independently of the first blade.

The first and second blade being pivotably connected and being pivotable about an pivot axis can be understood to mean that the blades are connected to the boom and/or to each other via a hinge (for example a hinge provided with a mechanical hinge axis or a flexible hinge made of plastic), but also that the blades are connected to the boom and/or to each other via a bendable (plastic) strip, the pivot axis being present, for example, at the location of the attachment of this bendable strip to the boom or to one of the blades.

Background of the Invention

A spraying device according to the preamble of claim 1 is known from GB2273028A. In this known spraying device, the two blades are directly hingedly attached to the boom and extend downwardly from the boom. The nozzles are also attached directly to the boom and are directed vertically downwards. The blades serve to shield the nozzles while driving so that less spray liquid is blown away.

SUMMARY OF THE INVENTION

An object of the invention is to improve the known spraying device. More in particular, the object of the invention is to provide a spraying device of the type mentioned in the preamble, wherein the blades direct the air past the nozzles so that even less spray liquid is blown away and the spray liquid is guided even better to the crop to be sprayed than is the case with the known spraying device. To this end, the spraying device according to the invention is characterized in that the second blade is connected to the first blade via a connecting structure, which connecting structure can be pivotably connected to the elongated boom thereby being pivotable about the first pivot axis, the first blade being attached to the connecting structure and the second blade being pivotally connected to the connecting structure. The connecting structure may be formed, for example, by a suspension element and blade supports attached to suspension element, to which blade supports the first blade is attached, and brackets attached to the suspension element, to which the second blade is pivotally connected. During operation, depending on the circumstances (wind speed and travel speed), the second blade adjusts its position relative to the first blade, whereby the air flow above the nozzles better directs the spray liquid to the crop. As a result, the spray liquid coming from the nozzles is better directed to the crops. During operation, that is to say during the advance of the spraying device, the air flow deflected by the second blade will better guide the spray liquid sprayed from the nozzles to the crops because the degree of deflection and thus control of the air flow through the second blade is dependent on the position of the spraying device, which position is determined by the wind and driving speed. The possible adverse effects of wind and ground speed on the direction of the air flow along the second blade are compensated by the adjustment of the position of the second blade by the driving wind flowing against it. It is noted that the position of the second blade can also be adjusted by a mechanical adjustment device instead of the position of the second blade being determined only by the air flow along the blade caused by the wind and speed of travel.

One embodiment of the spraying device according to the invention is characterized in that the spraying device comprises an elongated third blade, which is longitudinally parallel to the longitudinal direction of the first blade and is spaced from the first blade and is connected to the connecting structure, the third blade being not pivotable with respect to the first blade. The third blade, together with the first blade, being pivotable about the first pivot axis, but the third blade being not, independently of the first blade, pivotable about the first pivot axis.

Preferably, the connecting structure comprises an elongate suspension element, which is longitudinally parallel to the longitudinal direction of the first blade, and which is pivotally connected about the first pivot axis to the elongate boom of the agricultural tractor, the first blade being attached to the suspension element and the second blade being pivotally connected to the suspension element. Preferably, the third blade is also attached to the suspension element.

The connecting structure preferably comprises one or more first blade supports to which the first blade is attached and the second blade is preferably pivotally connected to the connecting structure via one or more second blade supports.

A further embodiment of the spraying device according to the invention is characterized in that the spraying device is provided with at least one first stop which limits rotation of the second blade about the first or second pivot axis in a direction towards the first blade.

The spraying device is preferably provided with at least one fastening element for fastening the spraying device to the boom present on the agricultural tractor, the connecting structure being pivotably connected to the fastening element, which fastening element is provided with at least one second stop which limits rotation of the connecting structure.

Each second blade support is preferably provided with a contact part which, upon rotation of the second blade in a direction away from the first blade, comes into contact with the stop, so that rotation in that direction is limited.

Preferably, the third blade is also attached to the connecting structure via one or more third nozzle carriers.

BRIEF DESCRIPTION OF THE DRAWINGS

The invention will be further elucidated below on the basis of exemplary embodiments of the spraying device according to the invention shown in the drawings. In the drawings.

Figure is a second embodiment of the spraying device according to the invention in side view.

DETAILED DESCRIPTION OF THE DRAWINGS

Figure 1:
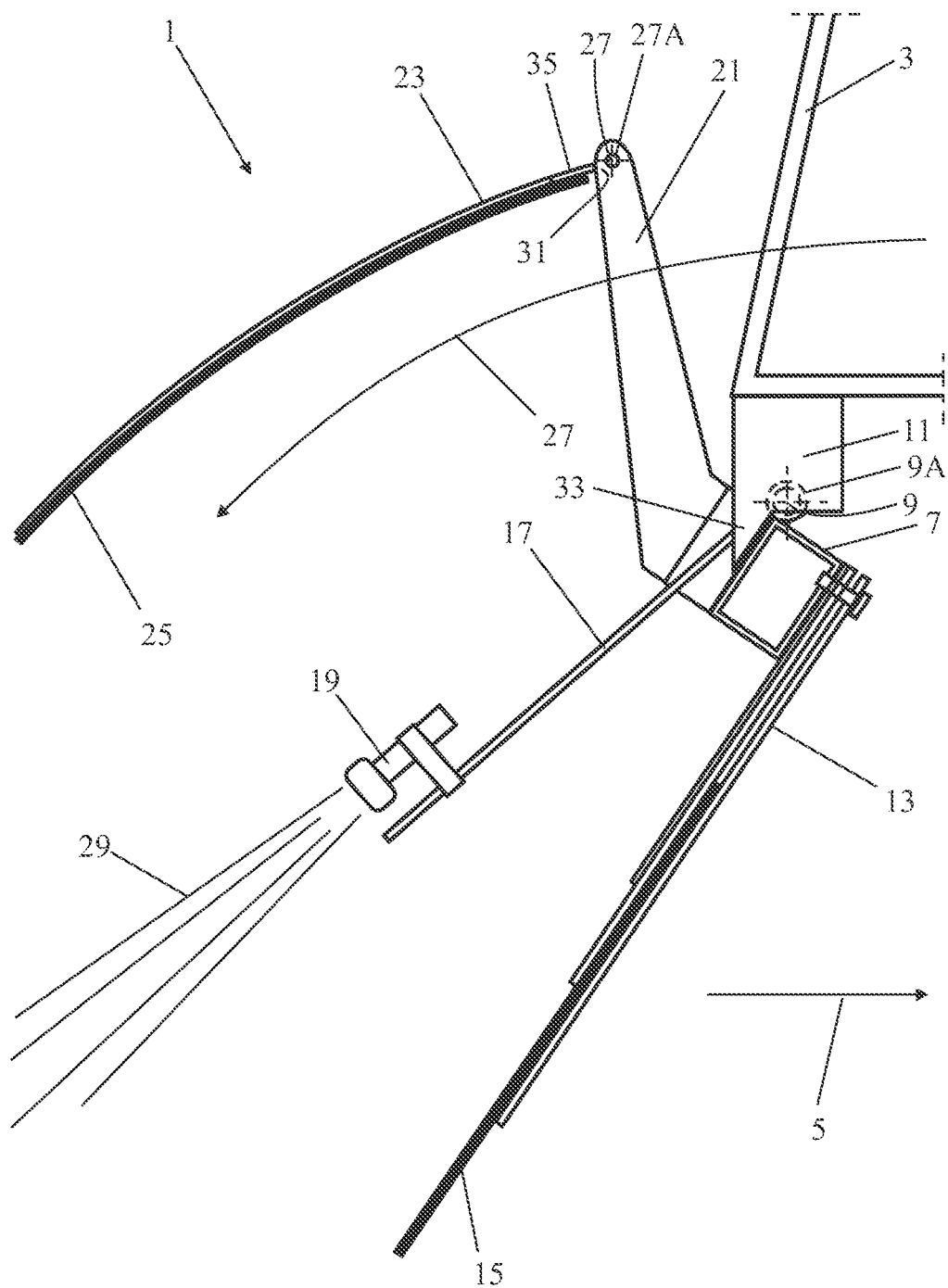
FIG. 1 is a first embodiment of the spraying device according to the invention in side view.
Figure 2:
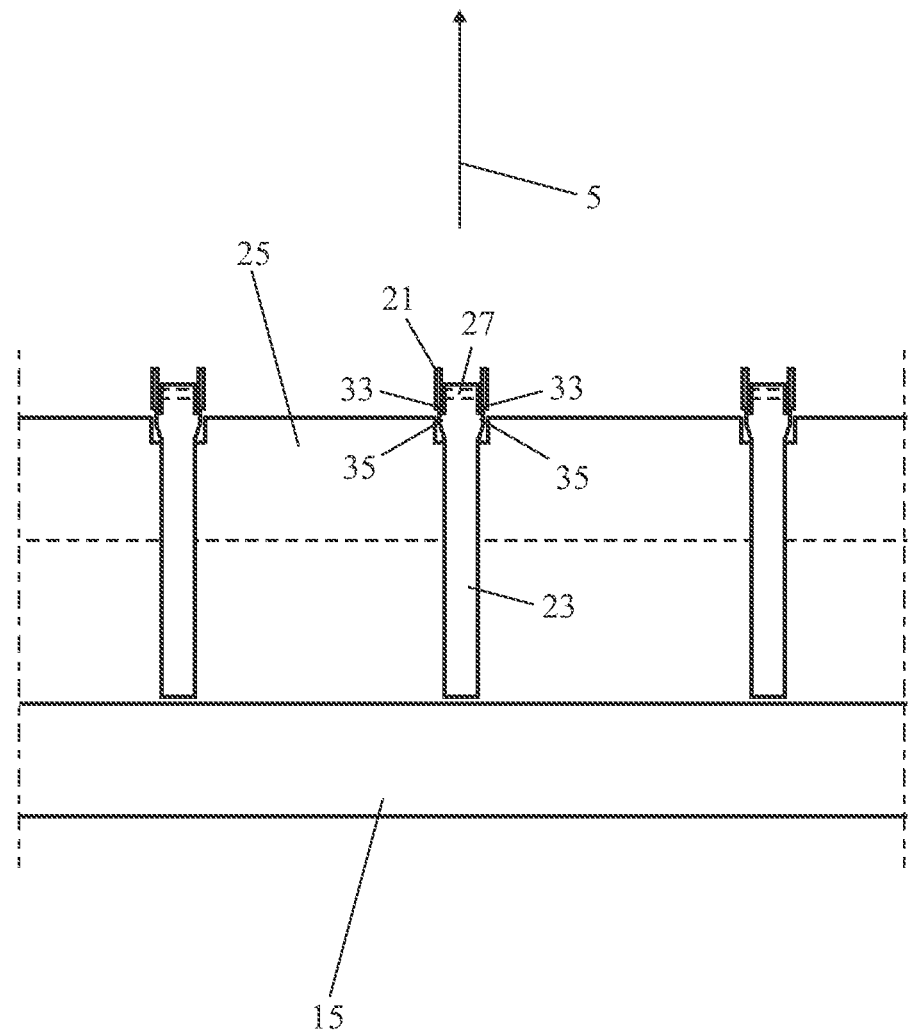
FIG. 2 is a part of the spraying device shown in FIG. 1 in top view.
Figure 3:
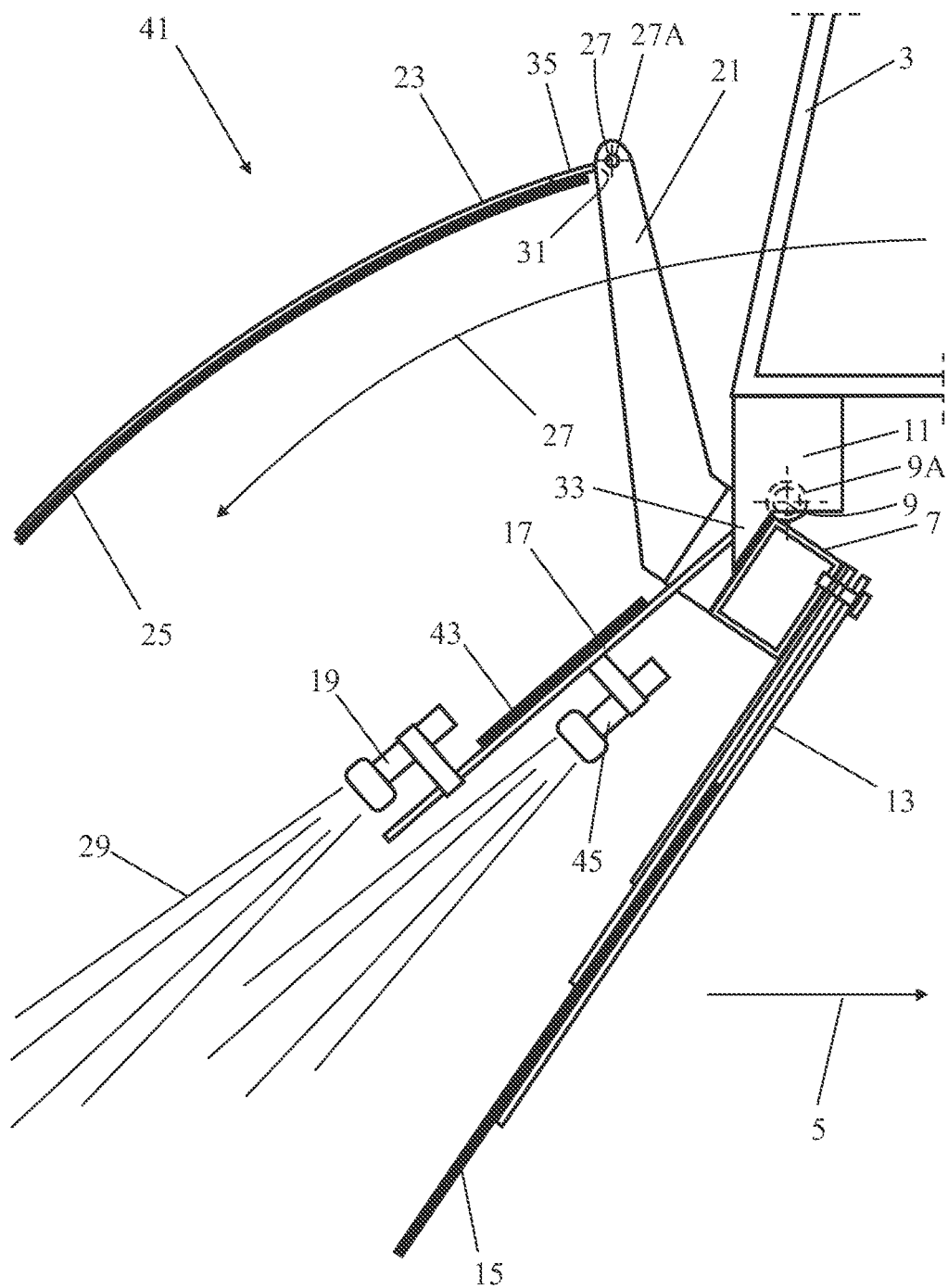
FIG. 3 is a second embodiment of the spraying device according to the invention in side view.

FIGS. 1 and 2 show a first embodiment of the spraying device 1 for spraying liquid on crops according to the invention in side view and top view, respectively. The spraying device 1 is hingedly connected to a boom 3 present on an agricultural tractor. During the spraying of liquid onto crops, the agricultural tractor moves over the crops and the boom 3 extends horizontally in the longitudinal direction and at right angles to the direction of movement 5 of the agricultural tractor.

The spraying device 1 has an elongated suspension element 7 which is connected via hinges 9 to fastening elements 11 with which the spraying device is attached to the boom 3. A number of first blade carriers 13 are attached to the suspension element 7, to which an elongated first blade 15 is attached. The first blade 15 is longitudinally parallel to the longitudinal direction of the boom 3. Nozzle carriers 17 are also attached to the suspension element 7 and are spaced from the first blade carriers 13. Nozzles 19 for spraying the spray liquid onto crops are present on these nozzle carriers 17.

Furthermore, a number of brackets 21 are attached to the suspension element 7 to which brackets second blade supports 23 are hingedly connected. An elongated second blade 25 is attached to these second blade supports, which second blade is also longitudinally parallel to the longitudinal direction of the suspension element 7. The second blade supports 23 are connected to the brackets 21 via second hinges 27. The second blade 25 is, seen in side view, slightly curved and connected to the first blade 15 only via the second hinges, so that the second blade 25 is pivotable completely independently of the first blade 15.

During spraying, the second blade 25 is present above the first blade 15 and the second blade 25 deflects the driving wind downwards, creating an air flow 27 above the spray jets 29 which ensures that the spray liquid does not blow away but ends up on the crops.

Parts of the brackets 21 form first stops 31 with which protrusions 35 on the second blade supports 23 come into contact when the second blade 25 is rotated toward the first blade 15. This prevents the second blade 25 from deflecting the air flow too much downwards at a low driving wind speed.

The fastening elements 11 are provided with a number of second stops 33 which limit the rotation of the suspension element 7 and thus also that of the first blade 15. As a result, the first blade 15 remains obliquely downwards even at high wind speeds.

FIG. 3 shows a second embodiment of the spraying device 41 according to the invention in side view. All parts identical to those of the first embodiment are designated with the same reference numerals. This spraying device 41 further has a third blade 43 attached to the nozzle carriers 17 as well as further spray nozzles 45 which are also attached to the nozzle carriers 17. These further nozzles 45 blow air during spraying in order to better guide the spray liquid from the nozzles 19 to the crops. These further nozzles 45 are directed in the same direction as the nozzles 19 and are present on the side of the third blade 43 facing the first blade 15.

Although the present invention is elucidated above on the basis of the given drawings, it should be noted that this invention is not limited whatsoever to the embodiments shown in the drawings. The invention also extends to all embodiments deviating from the embodiments shown in the drawings within the scope of the invention defined by the appended claims.

The invention claimed is:

1. Spraying device for coupling to an elongated boom present on an agricultural tractor for spraying liquid onto crops, comprising:

an elongated first blade, pivotally connected to the boom about a first pivot axis parallel to the longitudinal direction of the first blade, the boom during spraying of liquid to the crops, extending in longitudinal direction perpendicular to the direction of travel of the agricultural tractor, the first blade being longitudinally parallel to the boom, a number of nozzles configured for spraying liquid toward the crops, said nozzles are connected to the first blade and are directed in a direction transverse to the longitudinal direction of the first blade, and an elongated second blade longitudinally parallel to the longitudinal direction of the first blade, said second blade is mounted above said nozzles and is spaced from and connected to the first blade, which second blade is pivotable about the first pivot axis and/or a second pivot axis parallel to the first pivot axis, and which second blade is pivotable independently of the first blade, wherein the second blade is connected to the first blade via a connecting structure, which connecting structure is pivotably connected to the elongated boom thereby being pivotable about the first pivot axis, the first blade being attached to the connecting structure and the second blade being pivotally connected to the connecting structure, wherein the second blade is disposed with respect to the first blade such that during travel of the tractor in said direction of travel, air flow in an opposite direction enters between said first and second blades; and wherein position of said second blade with respect to said first blade is adjustable such that said second blade deflects the air flow above the liquid sprayed by said nozzles such that the liquid sprayed is guided to towards the crops.

2. Spraying device according to claim 1, wherein the spraying device comprises an elongated third blade being longitudinally parallel to the longitudinal direction of the first blade and being spaced from the first blade and being connected to the connecting structure, the third blade being non-rotatable relative to the first blade.

3. Spraying device according to claim 1 wherein the connecting structure comprises an elongated suspension element which is longitudinally parallel to the longitudinal direction of the first blade, and which can be pivotably connected to the elongated boom thereby being pivotable about the first pivot axis, the first blade being rigidly connected to the suspension element and the second blade is pivotably connected to the suspension element.

4. Spraying device according to claim 2 wherein the third blade is attached to the suspension element.

5. Spraying device according to claim 1, wherein the connecting structure comprises one or more first blade supports to which the first blade is attached.

6. Spraying device according to claim 1, wherein the second blade is pivotably connected to the connecting structure via one or more second blade supports.

7. Spraying device according to claim 1, wherein the spraying device is provided with at least one first stop which prevents rotation of the second blade about the first or second pivot axis in a direction towards the first blade.

8. Spraying device according to claim 7, wherein the spraying device is provided with at least one fastening element for fastening the spraying device to the boom present on the agricultural tractor, wherein the connecting structure is pivotally connected to the fastening element, which fastening element is provided with at least one second stop which limits rotation of the connecting structure.

9. Spraying device according to claim 7 wherein each second blade support is provided with a contact part which, when the second blade is turned in a direction away of the first blade, comes into contact with the first stop so that rotation in that direction is limited.

10. Spraying device according to claim 2, characterized in that the third blade is attached to the connecting structure via nozzle carriers.

\* \* \* \* \*